United States Patent
Kolodner et al.

(10) Patent No.: US 6,427,154 B1
(45) Date of Patent: Jul. 30, 2002

(54) METHOD OF DELAYING SPACE ALLOCATION FOR PARALLEL COPYING GARBAGE COLLECTION

(75) Inventors: Elliot K. Kolodner; Erez Petrank, both of Haifa (IL)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 09/630,806

(22) Filed: Aug. 2, 2000

Related U.S. Application Data

(63) Continuation of application No. 09/464,955, filed on Dec. 16, 1999.

(51) Int. Cl.$^7$ .............................. G06F 17/30; G06F 7/00
(52) U.S. Cl. ..................................................... 707/206
(58) Field of Search ........................ 707/206; 709/104.1

(56) References Cited

U.S. PATENT DOCUMENTS

| | | | | |
|---|---|---|---|---|
| 4,853,842 A | * | 8/1989 | Thatte et al. | 707/206 |
| 5,218,698 A | * | 6/1993 | Mandl | 711/165 |
| 5,687,368 A | * | 11/1997 | Nilsen | 707/103 R |
| 5,873,104 A | * | 2/1999 | Tremblay et al. | 707/206 |
| 6,065,020 A | * | 5/2000 | Dussud | 707/206 |
| 6,098,089 A | * | 8/2000 | O'Connor et al. | 707/206 |
| 6,219,678 B1 | * | 4/2001 | Yelland et al. | 707/103 R |
| 6,279,012 B1 | * | 8/2001 | Sexton et al. | 707/206 |
| 6,308,319 B1 | * | 10/2001 | Bush et al. | 707/206 |
| 6,327,701 B2 | * | 12/2001 | Ungar | 707/101 |

OTHER PUBLICATIONS

Corporal H., Real Realtime Performance of Heap Management Systems, using Incremental Copying Collectors, Delft University of Technology: Faculty of Electrical Engineering Section Computer Architecture and Digital Systems, 1991.*
Akira Imani and Evan Tick, "Evaluation of Parallel Copying Garbage Collectiob on a Shared–Memory Multiprocessor", IEEE, vol. 4 No. 9, Sep. 1993 , pp. 1030–1040.*

* cited by examiner

*Primary Examiner*—Jack Choules
*Assistant Examiner*—Susan Rayyan
(74) *Attorney, Agent, or Firm*—Scully, Scott, Murphy & Presser; Manny W. Schecter, Esq.

(57) ABSTRACT

The present invention relates to a method of delaying space allocation for parallel copying garbage collection in a data processing system comprising a memory divided in a current area (from-space) used by at least a program thread during current program execution and reserve area (to-space), and wherein a copying garbage collection is run in parallel by several collector threads, the garbage collection consisting in stopping the program threads and flipping the roles of the current area and reserved area before copying into the reserved area the live objects stored in the current area. Such a method comprises the steps of checking (12) by one collector thread the live objects of the current area to be copied in said reserved area, the live objects being referenced by a list of pointers; storing for each live object, a record into an allocation log, this record including at least the address of the object and its size; adding (14) the object size to a total_size which is the accumulated size of all the checked objects for which a record has been stored in the allocation log; and copying (20) all the checked objects into the reserved area when the value of total_size reaches a predetermined allocation bound.

17 Claims, 3 Drawing Sheets

METHOD OF DELAYING SPACE ALLOCATION FOR PARALLEL COPYING GARBAGE COLLECTION

This application is a continuation of U.S. application Ser. No. 09/464,955, filed Dec. 16, 1999.

BACKGROUND OF THE INVENTION

1. Technical Field

The present invention relates generally to a technique for automatically reclaiming the memory space which is occupied by data objects referred as garbage that the running program threads will not access any longer and relates particularly to a method of delaying space allocation for parallel copying garbage collection.

2. Prior Art

Garbage collection is the automatic reclamation of computer storage. While in many systems programmers must explicitly reclaim heap memory at some point in the program, by using a <<free>> or<<dispose>> statement, garbage collected systems free the programmer from this burden. The garbage collector's function is to find data objects that are no longer in use and make their space available for reuse by the running program. An object is considered garbage, and subject to reclamation, if it is not reachable by the running program thread via any path of pointer traversals. Live (potentially reachable) objects are preserved by the collector, ensuring that the program can never traverse a <<dangling pointer>> into a deallocated object.

The basic functioning of a garbage collector consists, abstractly speaking, of two parts 1. Distinguishing the live objects from the garbage in some way, or garbage detection, and
2. Reclaiming the garbage objects' storage, so that the running program thread can use it.

In practice, these two phases may be functionally or temporally interleaved, and the reclamation technique is strongly dependent on the garbage detection technique.

In general, the garbage collectors use a<<liveness>> criterion that is somewhat more conservative than those used by other systems. This criterion is defined in terms of a root set and reachability from these roots. At the point when garbage collection occurs, all globally visible variables of active procedures are considered live, and so are the local variables of any active procedures. The root set therefore consists of the global variables, local variables in the activation stack, and any registers used by active procedures. Heap objects directly reachable from any of these variables could be accessed by the running program thread, so they must be preserved. In addition, since the program might traverse pointers from those objects to reach other objects, any object reachable from a live object is also live. Thus, the set of live objects is simply the set of objects on any directed path of pointers from the roots.

Any object that is not reachable from the root set is garbage, i.e., useless, because there is no legal sequence of program actions that would allow the program to reach that object. Garbage objects therefore cannot affect the course of the computation, and their space may be safely reclaimed.

Given the basic two-part operation of a garbage collector, several variations are possible. The first part, that is distinguishing live objects from garbage, may be done by several methods. Among them, copying garbage collection does not really collect garbage. Rather, it moves all of the live objects into one area of the heap (space in the memory where all objects are held) whereas the area of objects that were copied can be reused for new objects.

A very common kind of copying garbage collection is the semi-space collector. In this scheme, the space devoted to the heap is subdivided into two parts, a current area or from-space and a reserved area or to-space. During normal program execution, only the from-space is in use. When the running program thread requests an allocation that will not fit in the unused area of the from-space, the program thread is stopped and the copying garbage collector is called to reclaim space. The roles of the current area and reserved area are flipped, that is all the live data is copied from the from-space to the to-space.

Once the copying is completed, the to-space is made the current area and program execution is resumed. Thus, the roles of the two spaces are reversed each time the garbage collector is invoked.

The advantages of the copying garbage collection are that the heap is compacted during each collection, the low complexity of the algorithm which touches only the live objects (rather than all the heap as in the Mark and Sweep algorithm) and the simplicity of allocation.

The algorithm used in the copying garbage collection are as follows:

1. Stop the program threads
2. Flip the roles of from-space and to-space
3. Scan the roots in each program thread (mutator) and also the global roots.—each object referenced by a root (a son of a root) is copied into to-space if it is not yet copied and a forwarding pointer is written in the original object of from-space, and
   the root pointer is updated to point to the new copy of the object in to-space.
4. Scan to-space
   each son of an object in to-space is copied into to-space if it is not yet copied, and a forwarding pointer is written in the original son, and
   the pointer in the father object is updated to point to the new replica of the son in to-space.
5. Reclaim the from-space area
6. Release the program threads Note that, although it is preferable to copy the objects after flipping the roles of from-space and to-space, the operation of flipping could be done after the operation of copying the objects.

One important part of the above algorithm is the part where the collector thread checks the roots and the live objects in the heap, and copies the live objects into to-space. The location of the copied objects in to-space is determined by modifying a single allocation pointer. But, working with this single pointer is no longer efficient without synchronization when several collector threads perform the copies since they compete on the same resource that is the pointer, causing thus an unacceptable contention. Another problem raised with several collector threads is the synchronization of the operation thereof since they use the same heap.

A solution is to let the collector threads allocate more space than they actually need. Namely, when a collector thread needs to copy an object into to-space, it actually allocates a big area (e.g. one page), copies the object, and keeps copying the next objects into this area until there is no more room and a new area has to be allocated. This method solves the contention problem in allocations to to-space since these allocations become much less frequent. However, a new problem arises: the fragmentation of to-space due to unused <<holes>> in the heap. To remedy this problem, it has been suggested that each collector thread allocates several areas, each area being characterized by the size of the objects allocated therein (each area is associated with a range of sizes). This scheme reduces the waste of space to half the space at worst case and less in practice. However, it requires a complicated management and it does not overcome the fragmentation problem.

SUMMARY OF THE INVENTION

Accordingly, the object of the invention is to achieve a method of space allocation for copying garbage collection allowing a parallel work of several parallel collector threads thereby achieving low contention.

Another object of the invention is to achieve a method of delaying space allocation for parallel copying garbage collection which completely eliminates the fragmentation of the heap.

Another object of the invention is to provide a data processing system implementing a method wherein the space allocation for copying garbage collection using several parallel collector threads is delayed until the accumulated size of the space required for copying a number of scanned objects reaches a predetermined value, thereby achieving low contention and eliminating the fragmentation of the heap.

Therefore, the invention relates to a method of delaying space allocation for parallel copying garbage collection in a data processing system comprising a memory divided in a current area (from-space) used by at least a program thread during current program execution and a reserved area (to-space), and wherein a copying garbage collection is run in parallel by several collector threads, the garbage collection consisting in, after the program threads have been stopped, flipping the roles of the current area and reserved area and copying into the reserved area the live objects stored in the current area, the allocation of space in the reserved area to copy the live objects therein being delayed until the accumulated size of the space required for copying a number of checked objects reaches a predetermined value.

The method of the invention comprises the steps of checking by one collector thread the live objects of the current area to be copied in the reserved area, the live objects being referenced by a list of pointers, storing, for each live object, a record into an allocation log, this record including at least the address of the pointer to the object, adding the size of the object to a total_size which is the accumulated size of all the checked objects for which a record has been stored in the allocation log, and copying all the checked objects into the reserved area when the value of total_size reaches a predetermined allocation bound.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

The present invention is implemented in a data processing system wherein the memory is divided in a current area (from-space) used by at least a program thread during current program execution and a reserved area (to-space), and wherein a copying garbage collection is run in parallel by several collector threads The main idea of the invention is to use the difference between a regular allocation performed by the application program and the special allocation performed by a collector thread. Indeed, when the application program allocates, the space must be assigned immediately since the heap manager cannot tell what the program does with the allocated space next. Conversely, the collector thread knows exactly what is the next step, and thus, the allocation may be delayed.

Figure 1:
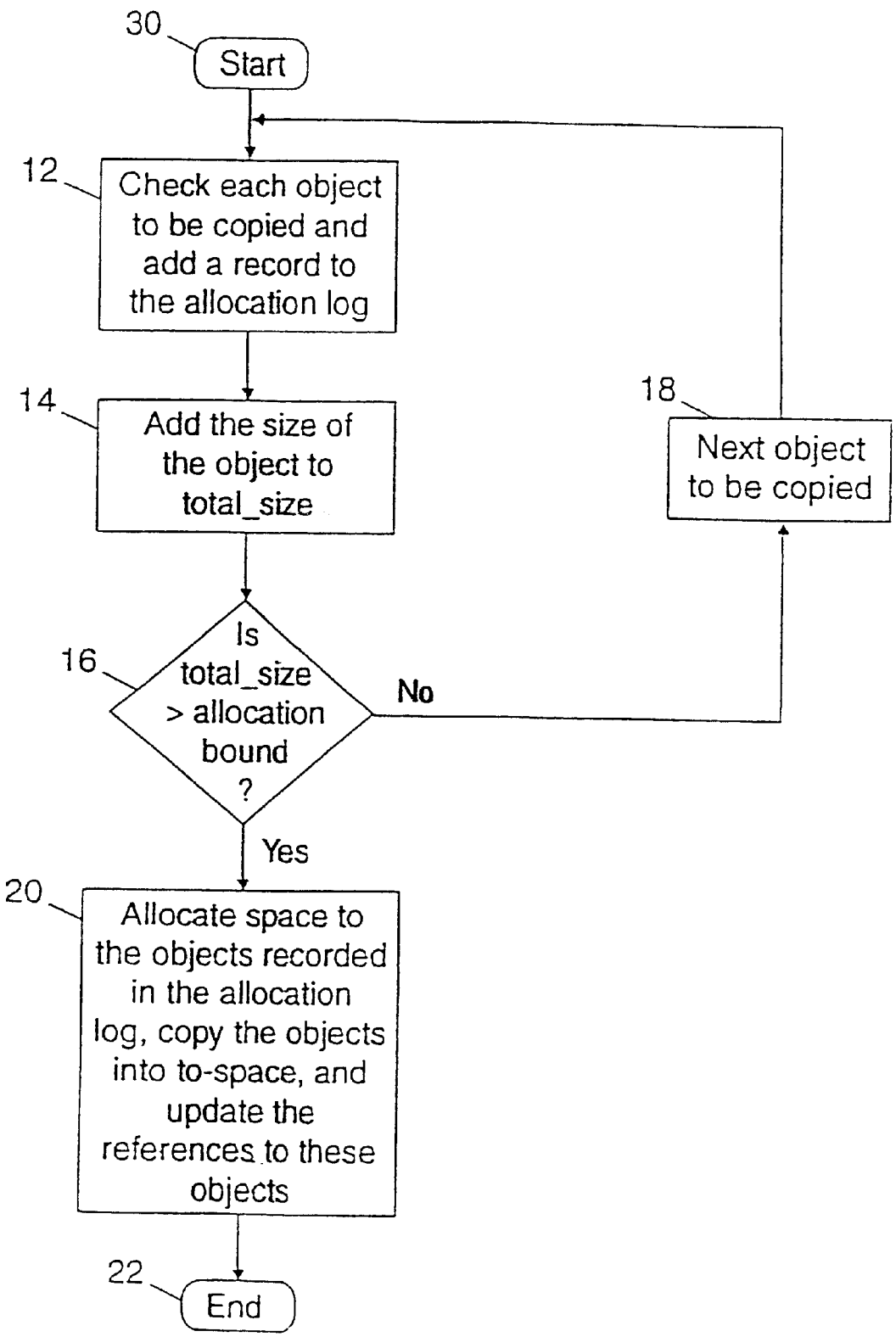
FIG. 1 is a flow chart representing the different steps of the method according to the invention.

Accordingly, after starting the space allocation operation (30), each object defined by a list of pointers is checked by the collector thread in charge and a record is added to an allocation log (12) as illustrated in FIG. 1. The objects being checked by the collector thread may be referenced by pointers in a root or by pointers in to-space objects (when they are sons of to-space objects). Note that there may be several ways a collector thread may get a list of pointers to the objects to be copied. But these different ways to get the list is not part of the invention and will not be described further.

Each record in the allocation log includes at least the address, which can be a root address or a to-space address, of the pointer to the object to be copied into to-space. The allocation log can also include the address in from-space of the object to be copied into to-space, and the size of this object. This size may be added to total_size (14) representing the accumulated size of all the previously checked objects.

Then, the variable total_size is compared to a predetermined allocation bound (16) to determine whether the accumulated size is big enough, for example greater than one page. If not, a next object to be copied has to be checked (18) and its associated record to be added in the allocation log.

When the accumulated total_size is equal or superior to the allocation bound, the collector thread allocates the needed space to the objects recorded in the log (note that the size of this space is known exactly) and it actually copies all the objects into to-space (20) and updates the references to the objects and ends the operation of space allocation (22).

Figure 2:
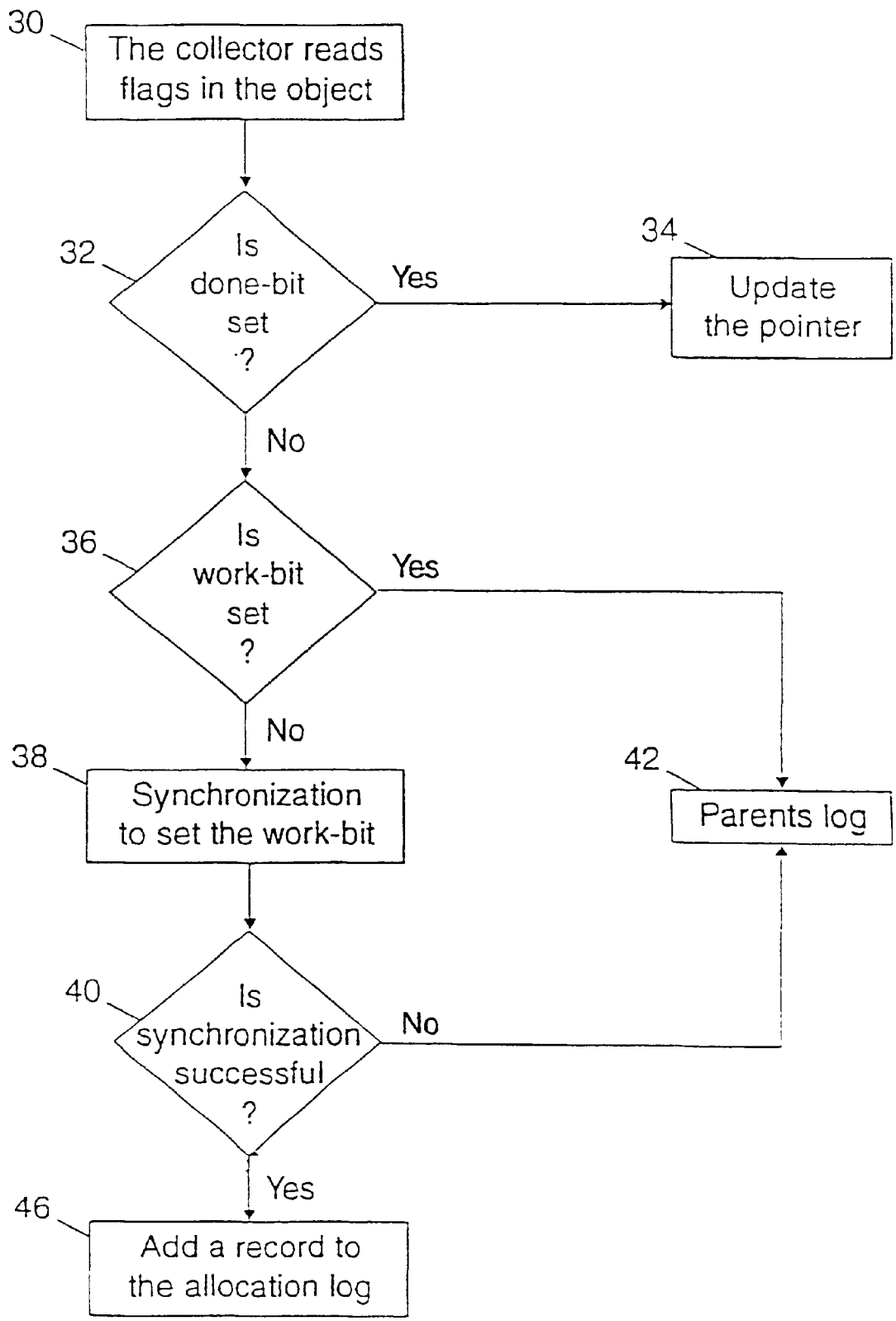
FIG. 2 is a flow chart representing the substeps included in the step of checking each object to be copied and adding a record to the allocation log.

The step of handling each object to be copied and adding a record to the allocation log is now described in reference to FIG. 2. Each object is associated with two flags which are read by the collector thread (30): a work-bit and a done-bit which are initially cleared. The work-bit is used to indicate that the object is being copied by a collector thread from from-space to to-space and that there is no need to perform this copy again. But, since this operation is not atomic, a done-bit is used to indicate that the work is done, i.e. there is a copy of this object in to-space and a forwarding pointer has been inserted in the original object of from-space pointing to the copy of this object in to-space.

Accordingly, a test is made to determine whether the done-bit of the object is set (32). If so, the collector thread updates its pointer (root pointer or parent object point) (34) according to the forwarding pointer inserted in the original object in from-space. If not, a test is made to determine whether the work-bit is set (36).

When the work-bit is not set, the collector thread will have to add a record to the allocation log for copying the object into to-space. Then, in order to set the work-bit to 1, the collector uses a synchronization operation (38) such as a wait-free synchronization or any other appropriate synchronization as it is well known to those skilled in the art. If the synchronization is not successful (40) because another collector thread is doing the copy or if the work-bit is already set to 1, a global structure called <<parents log>> (42) is used as described hereafter. If the synchronization operation is successful, a record is added to the allocation log (46).

Note also that, although any appropriate synchronization could be used for setting the work-bit, a wait-free synchronization is preferable. Indeed, a wait-free synchronization operation is performed by a synchronization mechanism that works in a <<wait-free>> manner, that is without blocking the computer that uses the instruction. Such an operation can be a compare and swap instruction including three parameters: address, compared-value and new-value. If the memory value for a given address matches the given compared-value, then the new-value is put into the location. The instruction returns a code indicating whether the comparison and setting were successful. The main feature of this instruction is that it is done atomically. Namely, no parallel process can change the value at the same time that the compare and swap instruction is executed. After the failure of such an instruction, the process may decide whether to try again or to execute another code after the failure. Conversely to a wait-free synchronization, a blocking synchronization would keep the thread blocked until the end of the operation.

Figure 3:
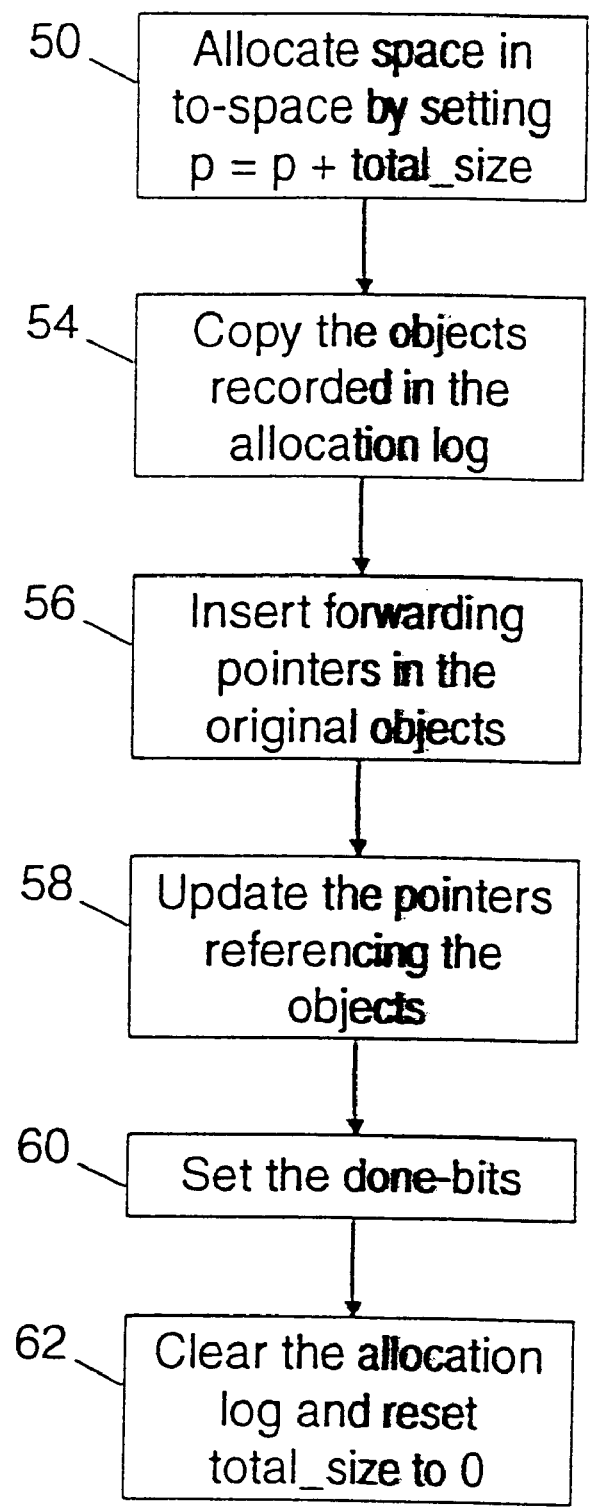
FIG. 3 is a flow chart representing the substeps included in the step of allocation space to the objects recorded in the allocation log and copying the objects into to-space.

The step of allocating space and copying the objects in to-space is now described in reference to FIG. 3. It is reminded that this step is launched when the accumulated size (total_size) of the objects to be copied being equal or greater than an allocation bound, for example the size of a page, the collector decides to allocate space in to-space (50). One possible way to allocate space in to-space is to use a pointer p pointing to the end of the allocated space in to-space.

Then, the objects recorded in the allocation log are copied into the allocated space (54) and forwarding pointers are inserted in the original objects of from-space (56). Pointers to said objects, which are either in roots or in parents in to-space, are updated (58). At last, the done-bit of each object being copied is set to 1 (60), and the collector thread clears the allocation log and resets total_size to 0 (62).

Returning to the cases when the work-bit is set whereas the done-bit is not set or the synchronization operation is not successful because, in both cases, the pointed object is being handled by another collector thread, it would not be efficient to let the collector thread await until the other collector thread completes the pointer updating. Therefore, a parents log is used (see FIG. 2) to record the <<parents>> whose pointers could not be updated since the <<son>> was being copied at the time the parent was checked. A record in the parents log contains the address of the son in from-space. The parents log is global rather than being associated with an object, and the collector threads return to processing the parents log when they cannot find anymore objects to scan (usually, towards the end of the garbage collection). During the processing of the parents log by any one of the collector threads, the done-bit of each object recorded in the log is read. If the done-bit is not set to 1, the record is kept in the parents log. Otherwise, the collector thread assigns the forwarding address of the object to the parent pointer and the record is remove from the parents log.

Note that, instead of updating the parents log each time a problematic pointer is traversed, it is possible to use a buffering system. Namely, the collector thread stores the parents log record in a local private buffer until several records have been accumulated. Then, it adds the buffer to the parents log using a synchronization operation such as a compare and swap instruction. Thus, the parents log becomes a list of buffers, each of which containing actual records of the parents log. The collector threads which will later apply the records in the log, will take a full buffer from the log. This way reduces the synchronization in a very simple manner. Furthermore, the size of the buffers can be set as a parameter tuned by the behavior of the applications.

The method according to the invention has the advantage to avoid fragmentation since the allocated space in to-space exactly matches the space needed to copy the objects mentioned in the log. Also, the frequency of conflicts and synchronized operations does not increase. Finally, big objects do not require special care, and they fall naturally into the framework set by delayed allocation.

While the invention has been particularly shown and described with respect to preferred embodiments thereof, it will be understood by those skilled it the art that the foregoing and other changes in form and details may be made therein without departing form the spirit and scope of the invention.

Having thus described our invention, what we claim as new, and desire to secure by Letters Patent is:

1. A method of delaying space allocation for parallel copying garbage collection in a data processing system comprising a memory divided in a current area (from-space) used by at least a program thread during current program execution and a reserved area (to-space), and wherein a copying garbage collection is run in parallel by several collector threads, said garbage collection consisting in, after the program threads have been stopped, flipping the roles of said current area and reserved area and copying into said reserved area the live objects stored in said current area;

wherein an allocation of space in said reserved area to copy said live objects therein is delayed until the accumulated size of the space required for copying a number of checked objects reaches a predetermined value.

2. The method according to claim 1, comprising the steps of scanning by one collector thread the live objects in said current area to be copied into said reserved area, said live objects being referenced by a list of pointers, storing, for each one of said live objects, a record into an allocation log, said record including at least the address of pointer to said live object, adding the size of live object to a total_size which is the accumulated size of all the checked objects for which a record has been stored in said allocation log, and copying all said checked objects into said reserved area when the value of total_size reaches a predetermined allocation bound.

3. The method according to claim 2, wherein two flags are associated with each live object in said current area, a work-bit and a done-bit which are initially cleared, said checking step of a live object consisting in reading said flags to determine whether they are set, a record being added to said allocation log only when both work-bit and done-bit are not set to 1.

4. The method according to claim 3, wherein said work-bit is set to 1 before adding a record to said allocation log, the operation of setting said work-bit to 1 being made by using an appropriate synchronization.

5. The method according to claim 4, wherein said appropriate synchronization is a wait-free synchronization.

6. The method according to claim 5, wherein said wait-free synchronization is achieved by a compare and swap instruction.

7. The method according to claim 3, wherein the pointer referencing a live object is updated according to a forwarding pointer inserted in the original live object in said current area when said done-bit is already set to 1.

8. The method according to claim 3, wherein a record associated with said live object is added to a parents log common to all collector threads in order to be processed later when said done-bit is not set to 1 whereas said work-bit is already set to 1 meaning that said live object is being handled by another collector thread.

9. The method according to claim 8, wherein said record added to said parents log includes at least the address of the reference to said live object in said current area.

10. The method according to claim 9, wherein said parents log is processed by any one of said collector threads when these ones cannot find any more objects to check, the processing consisting in checking whether the done-bit of each object recorded in said parents log is set to 1 and removing the record from said parents log only if said done-bit is set to 1.

11. The method according to claim 10, wherein the pointer referencing a copied object is updated according to a forwarding pointer inserted in the original object in said current area when said done-bit has been set to 1.

12. The method according to claim 3, wherein said step of copying said checked objects into said reserved area when said total_size reaches a predetermined bound consist in:
   allocating a space in said reserved area corresponding to the value of total_size,
   copying the objects recorded in said allocation log into said allocated space,
   inserting forwarding pointers in the original live objects of said current space which have been copied,
   updating each pointer of said list of pointers to live objects which have been copied into said reserved area,
   setting to 1 the done-bits of said live objects which have been copied into said reserved area, and
   clearing said allocation log and resetting the value of total_size to 0.

13. The method according to claim 12, further comprising the step of updating a pointer p defining the end of said allocated space by adding to the pointer value the value of total_size.

14. The method according to claim 1, wherein said live objects in said current area to be copied into said reserved area are referenced by pointers located in the roots.

15. A data processing system comprising a memory divided in a current area (from-space) used by at least a program thread during current program execution and a reserved area (to-space), and wherein a copying garbage collection is run in parallel by several collector threads, said garbage collection consisting in, after the program threads have been stopped, flipping the roles of said current area and reserved area and copying into said reserved area the live objects stored in said current area;
   wherein said system comprises allocation means delaying the allocation of space in said reserved area to copy said live objects therein until the accumulated size of the space required for copying a number of checked objects reaches a predetermined value.

16. The data processing system according to claim 15, wherein said allocation means comprises:
   means for checking by one collector thread the live objects in said current area to be copied into said reserved area, said live objects being referenced by a list of pointers,
   means for storing, for each one of said live objects, a record into an allocation log, said record including at least the address of said object,
   means for adding the size of said object to a total_size which is the accumulated size of all the checked objects for which a record has been stored in said allocation log, and
   means for copying all said checked objects into said reserved area when the value of total_size reaches a predetermined allocation bound.

17. The data processing system according to claim 16, wherein two flags are associated with each live object in said current area, a work-bit and a done-bit which are initially cleared, said checking means reading said flags to determine whether they are set, a record being added to said allocation log only when both work-bit and done-bit are not set to 1.

* * * * *